(12) United States Patent
Koike

(10) Patent No.: US 10,972,393 B2
(45) Date of Patent: Apr. 6, 2021

(54) REPEATER

(71) Applicant: DENSO CORPORATION, Kariya (JP)

(72) Inventor: Tomoyuki Koike, Kariya (JP)

(73) Assignee: DENSO CORPORATION, Kariya (JP)

( * ) Notice: Subject to any disclaimer, the term of this patent is extended or adjusted under 35 U.S.C. 154(b) by 64 days.

(21) Appl. No.: 16/190,480

(22) Filed: Nov. 14, 2018

(65) Prior Publication Data

US 2019/0158402 A1 May 23, 2019

(30) Foreign Application Priority Data

Nov. 20, 2017 (JP) ................. 2017-222632

(51) Int. Cl.
| | |
|---|---|
| *H04L 12/741* | (2013.01) |
| *H04B 3/36* | (2006.01) |
| *H04L 12/24* | (2006.01) |
| *H04L 12/751* | (2013.01) |
| *H04L 29/08* | (2006.01) |

(52) U.S. Cl.
CPC ............ *H04L 45/745* (2013.01); *H04B 3/36* (2013.01); *H04L 41/0816* (2013.01); *H04L 45/02* (2013.01); *H04L 67/12* (2013.01)

(58) Field of Classification Search
CPC ... H04L 45/745; H04L 41/0816; H04L 45/02; H04L 67/12; H04B 3/36
See application file for complete search history.

(56) References Cited

U.S. PATENT DOCUMENTS

2014/0297109 A1   10/2014   Shimomura et al.

FOREIGN PATENT DOCUMENTS

| JP | H07-120196 A | 5/1995 |
| JP | 2013-149191 A | 8/2013 |
| JP | 2014-090249 A | 5/2014 |
| JP | 2016-092484 A | 5/2016 |

*Primary Examiner* — Omar J Ghowrwal
(74) *Attorney, Agent, or Firm* — Posz Law Group, PLC

(57) ABSTRACT

A repeater is used in an in-vehicle communication system for retransmitting communication frames between communication nodes. The repeater includes a storage unit, a retransmission unit, a determiner, and a generator. The storage unit stores a routing map that associates a frame ID that identifies a communication frame from a communication node and a destination of the communication frame. The retransmission unit retransmits the communication frame between the communication nodes based on the routing map stored in the storage unit. The determiner determines whether a preset condition for generating the routing map is satisfied. The generator generates the routing map based on information in the communication frame received from the communication node and stores the map in the storage unit when the determiner determines that the preset condition is satisfied.

7 Claims, 6 Drawing Sheets

FIG. 3

| CHANNEL | FRAME ID |
|---|---|
| Ch1 | 11,14,21,24,31 |
| Ch2 | 15,17,29,3871,••• |
| ⋮ | ⋮ |
| Ch5 | 13,14,17,35,36,••• |

| UNIQUE ID | FRAME ID |
|---|---|
| 40 | 11,21,31 |
| 41 | 14,24,31 |
| 42 | 15,38,71 |
| 43 | 17,29,71 |
| ⋮ | ⋮ |
| 46 | 14,18 |
| ⋮ | ⋮ |
| 50 | 14,35 |
| ⋮ | ⋮ |
| 60 | 17,36 |
| ⋮ | ⋮ |

| UNIQUE ID | CHANNEL |
|---|---|
| 40 | Ch1 |
| 41 | Ch1 |
| 42 | Ch2 |
| 43 | Ch2 |
| ⋮ | ⋮ |
| 50 | Ch5 |
| ⋮ | |
| 60 | |
| ⋮ | |

| CHANNEL | FRAME ID |
|---|---|
| Ch1 | 17,38 |
| Ch2 | 11,14,29,31 |
| Ch3 | 15,24 |
| Ch4 | 21,71 |
| Ch5 | ID OF ECUS CONNECTED TO REPS. 200, 300 |

~138

REPEATER

CROSS REFERENCE TO RELATED APPLICATION

The present application is based on and claims the benefit of priority of Japanese Patent Application No. 2017-222632, filed on Nov. 20, 2017, the disclosure of which is incorporated herein by reference.

TECHNICAL FIELD

The present disclosure generally relates to a repeater for retransmitting communication frames between communication nodes.

BACKGROUND INFORMATION

A repeater device retransmits communication frames (e.g., communication signals) between communication nodes. The repeater device stores retransmission information for determining a transmission destination (e.g., receiver) of a communication frame received from the transmission source (e.g., sender) of the communication frame. The communication frame includes an ID for identifying the sender communication node.

The relay information may also include a routing map. The routing map provides correspondence information between the sender ID and the receiver communication node associated with the sender ID.

When receiving a communication frame from a communication node, the repeater device may refer to the routing map based on the ID in the communication frame to determine the transmission network and the transmission destination of the communication frame from among a plurality of networks connected to the repeater device.

Repeaters may encounter problems in updating the routing map when new communication nodes are added to the communication network, and thus, are subject to improvement.

SUMMARY

In an aspect of the present disclosure, a repeater may be used in a vehicle communication system to retransmit communication frames between communication nodes. The repeater may include a storage unit. The repeater may further include a retransmission unit that may be configured to retransmit communication frames between the communication nodes based on a routing map that may be stored in the storage unit. The repeater may further include a determiner that may be configured to determine whether a preset condition for generating the routing map has been satisfied. The repeater may further include a generator that may be configured to generate and to store the routing map in the storage area based on information in the communication frames when the determiner determines that the preset condition is satisfied.

BRIEF DESCRIPTION OF THE DRAWINGS

Objects, features, and advantages of the present disclosure will become more apparent from the following detailed description made with reference to the accompanying drawings, in which:

FIG. 3 illustrates a routing map showing a correspondence between a frame ID of a communication frame received by the repeater and a destination channel;

FIG. 4 illustrates a node reception map showing a correspondence between frame IDs and intended receiver ECUs identified by unique IDs;

FIG. 5 illustrates a node connection map showing the channels to which each of the ECUs respectively identified by the unique IDs are connected;

FIG. 6 illustrates a channel ID map showing a correspondence between the frame IDs of the communication frames transmitted by the ECUs and the channels of the repeater at which the transmitted communication frames are received;

DETAILED DESCRIPTION

An embodiment of the present disclosure is described with reference to the drawings.

The present disclosure describes a repeater and a method performed by a repeater and other components of a communication system. The repeater of the present disclosure provides a low cost configuration and method that generates and updates a routing map without communicating with a device outside of the vehicle (e.g., external device). The conventional systems and apparatuses may update the routing map by communicating with devices outside the vehicle such as an external server that may save information for updating the routing map. In other words, the repeater and communication system of the present disclosure provide a low cost configuration and technique for updating a communication frame routing map without relying on devices external to the vehicle, and without relying on external communication for updating the communication frame routing map. Lower costs may be realized by avoiding external storage and external communications to update the routing map.

1. Configuration

Figure 1:
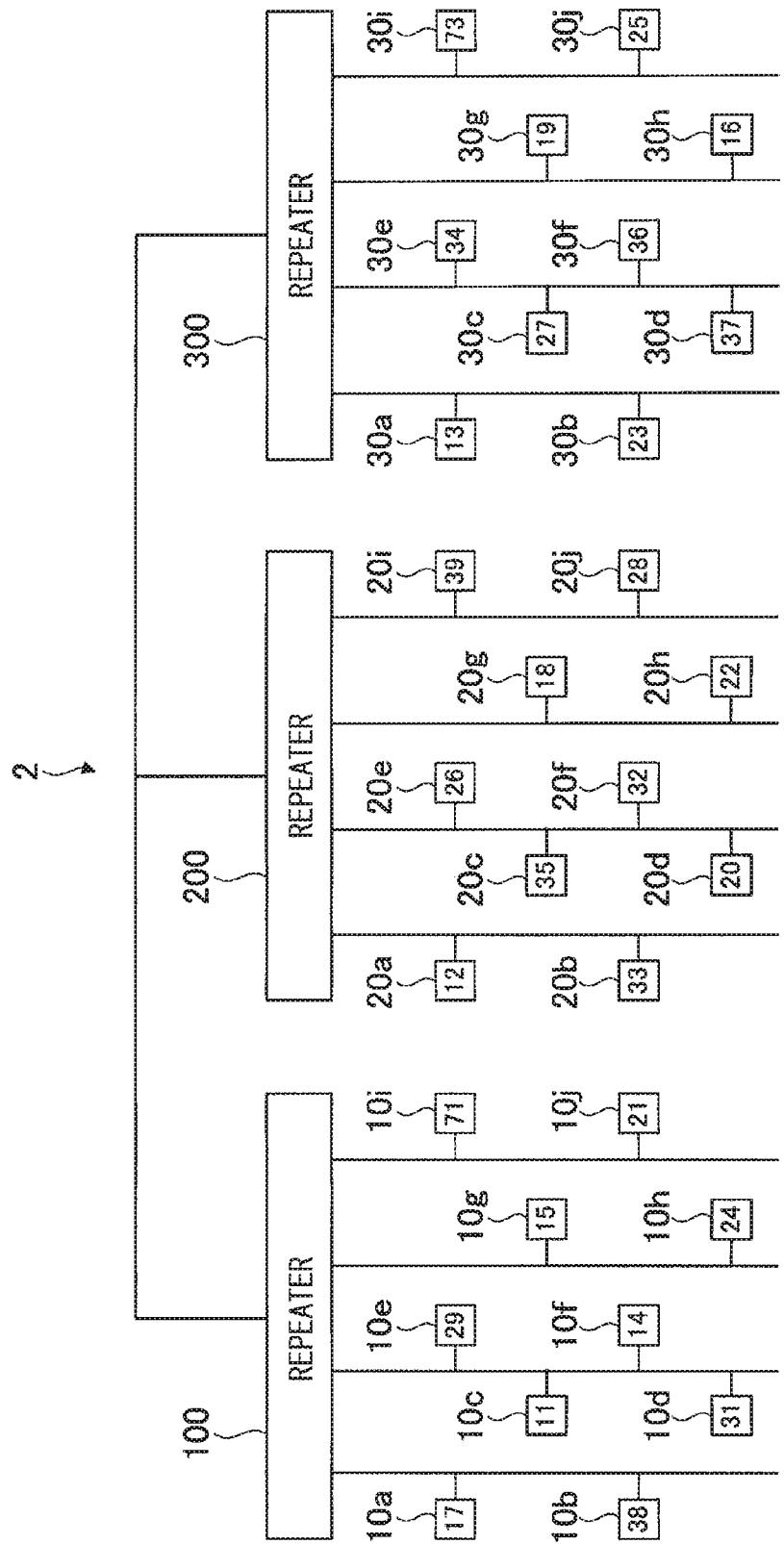
FIG. 1 illustrates a block diagram of an in-vehicle communication system according to an embodiment of the present disclosure.

With reference to FIG. 1, an example communication system 2 for use in a vehicle is illustrated. The vehicle is not illustrated in FIG. 1, but it is understood that the communication system 2 may be disposed in a vehicle, such as an automobile. The communication system 2 may include vehicle devices such as electronic control units (ECUs) 10*a* to 10*j*, ECUs 20*a* to 20*j*, ECUs 30*a* to 30*j*, and repeater devices 100, 200, and 300. The electronic control units are embedded controllers in the vehicle that may control vehicle systems and subsystems, for example, the vehicle engine, powertrain, transmission, braking, and suspension. The communication system 2 provides communication between the vehicle devices, and may function as an in-vehicle local area network (LAN), a control area network (CAN), an Ethernet, and/or any combination of LAN, CAN, and Ethernet. CAN and Ethernet are both registered trademarks.

Each of the ECUs 10a to 10j, 20a to 20j, and 30a to 30j are communication nodes configured to communicate with other communication nodes by sending communication signals or communication frames, referred to generally as a communication. A transmitting or sender ECU may send a communication to another ECU via a repeater device 100, 200, 300 that relays or retransmits the communication to an intended receiver ECU. Repeater devices (e.g., 100, 200, and 300) may be referred to simply as repeaters.

The ECUs 10a to 10j, the ECUs 20a to 20j, and the ECUs 30a to 30j are grouped according to their installation positions, that is, the position where each ECU is installed in the vehicle, regardless of the function of each ECU. Each of the ECUs 10a to 10j, 20a, to 20j, and 30a to 30j may be connected to a repeater, such as repeaters 100, 200, and 300. For example, the ECUs 10a to 10j may be installed in a front part of the vehicle and connected to the repeater 100, the ECUs 20a to 20j may be installed in a center part of the vehicle and connected to the repeater 200, and the ECUs 30a to 30j may be installed in a rear part of the vehicle and connected to the repeater 300. The repeaters 100, 200, and 300 may be connected to each other, such that the ECUs 10a to 10j, 20a to 20j, and 30a to 30j are interconnected to one another via the repeaters 100, 200, and 300.

In FIG. 1, the numerals in the rectangular frame of each ECU are the "ID" or ECU identifier of that particular ECU. The ID of the ECU is included as a frame ID in each communication frame transmitted by the ECU. That is, the frame ID may identify that a communication frame is sent by the ECU. The frame ID is set for each ECU, for example, according to a vehicle type. As such, the frame ID for an ECU may vary from vehicle to vehicle. For example, if an ECU from one vehicle of a certain vehicle type is removed and installed in another vehicle of a different vehicle type, the ECU may have different frame IDs, even if the ECU is used to control the same vehicle systems/subsystems in both of the vehicles.

The repeaters 100, 200, and 300 may have substantially the same configuration. The ECUs 10a to 10j 20a to 20j, and 30a to 30j may have substantially the same configuration. As such, for simplicity and ease of understanding, the examples in the description may describe repeater 100 and the ECUs 10a to 10j as representative examples, but such descriptions are understood to apply to repeaters 200 and 300 and their corresponding ECUs 20a to 20j and ECUs 30a to 30j as well.

Each of the repeater 100 and the ECUs 10a to 10j includes one or more microcomputers having a CPU or like processing devices (not shown). The repeater 100 and the ECUs 10 to 10j also include a semiconductor memory such as a RAM, a ROM, a flash memory, or like memory device. The semiconductor memory is a non-transitory, substantive storage medium. Respective functions of the repeater 100 and the ECUs 10a to 10j may be realized by the CPU executing a program or instruction set stored in the semiconductor memory. In other words, processes performed by the repeater 100 and each of the ECUs 10a to 10j may be realized by the CPU of the respective device executing a program stored in the memory of the respective device.

Figure 2:
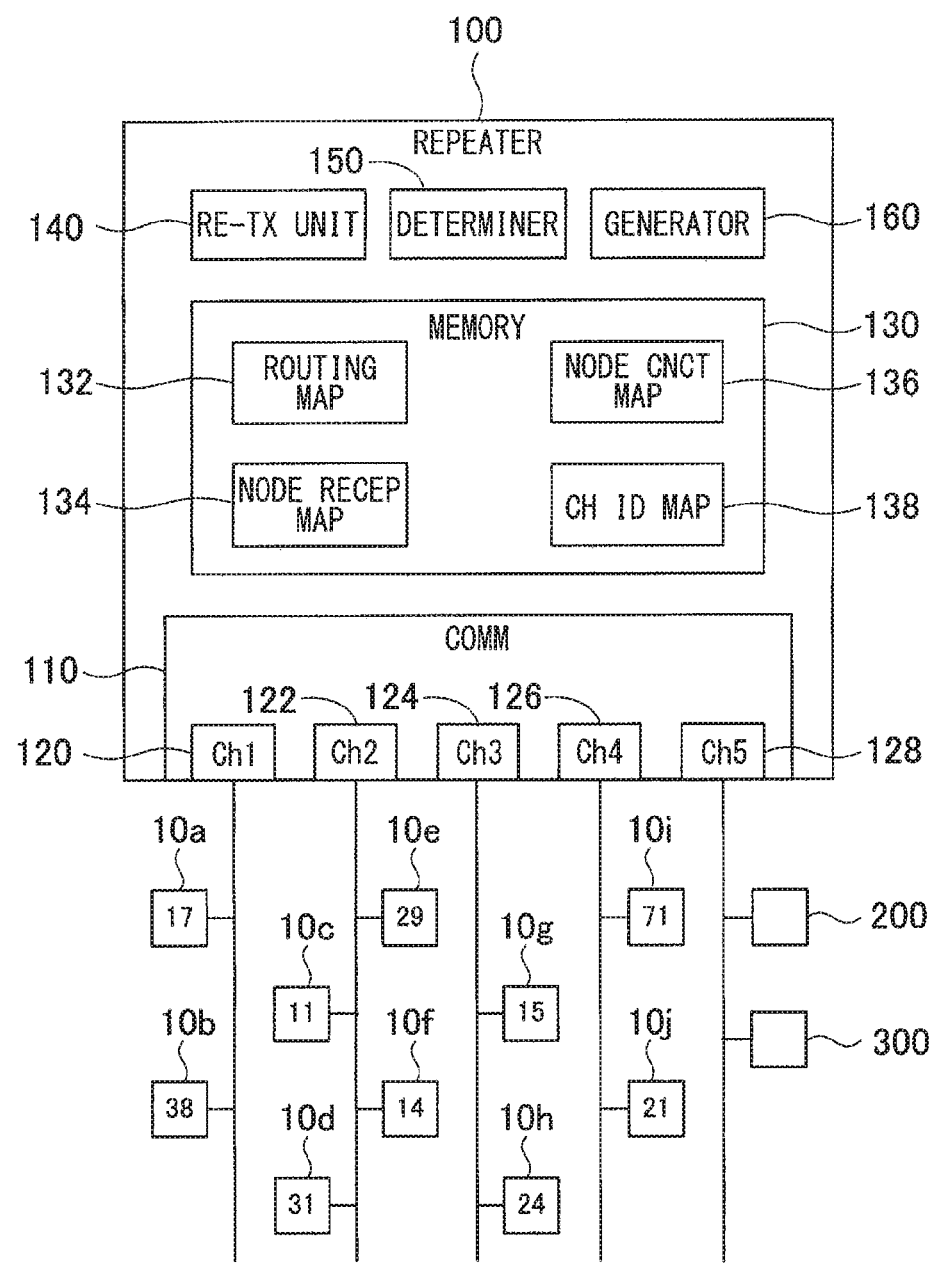
FIG. 2 illustrates a block diagram of a connection between a repeater and a plurality of ECUs.

With reference to FIG. 2, the repeater 100 includes a semiconductor memory 130. The semiconductor memory 130 may be a non-transitory, substantive storage medium storing a program. By executing such program, a method corresponding to the program is executed and performed by the repeater 100. The semiconductor memory may be referred to simply as a memory. The memory 130 may also be referred to as the storage unit 130. As described above, the memory 130 may be a nonvolatile, flash-type memory that allows data, programs, and the like to be written and rewritten to, and read from, the memory 130.

The repeater 100 communicates with the ECUs 10a to 10j, the ECUs 20a to 20j, and the ECUs 30a to 30j, as well as the other repeaters 200 and 300 via a communication unit 110. As shown in FIG. 2, the communication unit 110 includes five channels, e.g., Ch1, Ch2, Ch3, Ch4, and Ch5 numbered respectively as 120, 122, 124, 126, and 128.

The ECUs 10a and 10b are connected to the first channel 120, the ECUs 10c to 10f are connected to the second channel 122, the ECUs 10g and 10h are connected to the third channel 124, the ECUs 10i and 10j are connected to the fourth channel 126, and the repeaters 200 and 300 are connected to the fifth channel 128.

The relay device 100 includes a retransmission unit 140, a determiner 150, and a generator 160. The retransmission unit 140, the determiner 150, and the generator 160 may be realized as either hardware or software.

When the retransmission unit 140, the determiner 150, and the generator 160 are realized as software, the retransmission unit 140, the determiner 150, and the generator 160 may be considered as functional elements or functional blocks of the repeater 100 whose functions are realized by an execution of a program stored in the memory 130 by the CPU.

When the retransmission unit 140, the determiner 150, and the generator 160 are realized as hardware, the functions performed by each of the retransmission unit 140, the determiner 150, and the generator 160 may be realized by a dedicated or specific electronic circuit configured specifically for performing the respective function/process associated with the retransmission unit 140, the determiner 150, and the generator 160. Such electronic circuits may be a digital circuit with digital circuit elements, an analog circuit with analog circuit elements, or as a combination of digital and analog circuit elements. The circuits may include logical circuit elements such as logic gates, latches, and the like. Each of the retransmission unit 140, the determiner 150, and the generator 160 may be realized as an application-specific integrated circuit (ASIC), field-programmable gate array (FPGA), or like circuit configured to perform a specific process.

The memory 130 stores a routing map 132, a node reception map 134, a node connection map 136, a channel ID map 138, as well as storing other data and programs.

When the repeater 100 receives a communication frame from a communication node at one of the channels 120, 122, 124, 126, and 128, the relay unit 140 first determines to which channel 120, 122, 124, 126, and 128 the received communication frame should be transmitted based on the routing map 132 and the frame ID in the received communication frame. That is, more practically, the retransmission unit 140 transmits the received communication frame to an appropriate channel or channels 120, 122, 124, 126, and 128 of the communication unit 110 based on the frame ID in the received communication frame for transmission to an intended receiver ECU based on the routing map 132. The intended receiver ECU is the ECU or ECUs that plan or intend to receive the communication frame based on the frame ID in the communication frame.

As shown in FIG. 3, the routing map 132 stores correspondence information, that is, the association between (i) the frame ID in the communication frame received by the communication unit 110 and (ii) the channel number or numbers of the intended receiver ECU(s).

For example, as shown in FIG. 3, when the communication unit 110 receives a communication frame having a frame ID "14," the retransmission unit 140 determines based on the routing map 132 that the ECU(s) intending to receive such communication frame are connected to the first channel 120 and the fifth channel 128 of the communication unit 110. Then, the retransmission unit 140 transmits the communication frame having the frame ID "14" to the channels 120 and 128 of the communication unit 110.

Since the repeaters 200 and 300 are connected to the channel 128, the intended receiver ECU(s) of the communication frame with ID "14" may be one or more of the ECUs 20a to 20j connected to the repeater 200 and/or one or more of the ECUs 30a to 30j connected to the repeater 300. The repeaters 200 and 300 receiving the communication frame with the frame ID "14" respectively transmit the received communication frame to the channel or channels to which the intended receiver ECU(s) is/are attached. Each of the repeaters 200 and 300 may respectively have its own routing map for further routing of received communication frames.

The generator 160 generates the routing map 132 when a preset condition is satisfied and the generated routing map 132 is stored in the memory 130. The routing map 132 may be updated so that the routing map is rewritten to the memory 130.

As shown in FIG. 4, the node reception map 134 shows a correspondence between (i) a unique ID assigned to each of the ECUs 10a to 10j, 20a to 20j, 30a to 30j in the communication system 2, and (ii) the frame IDs intended to be received by each ECU. That is, the frame IDs of the communication frames and the associated intended receiver ECU, as indicated by a unique ID.

The unique ID is a distinct, individual ID assigned respectively to each ECU according to the function of the ECU regardless of the vehicle type. As described above, the frame ID is the ID in the communication frame transmitted by each ECU to identify the transmitting ECU. The unique IDs and the frame IDs are respectively different IDs.

As shown in FIG. 5, a node connection map 136 is a map showing the unique IDs of the ECUs and the corresponding channel of the repeater 100 to which the unique ID (e.g., ECU) is connected. The generator 160 generates the node connection map 136 before generating the routing map 132 when a preset condition is satisfied.

As shown in FIG. 6, a channel ID map 138 shows the frame ID generated by each of the ECUs connected to the respective channels 120, 122, 124, 126, and 128 of the communication unit 110. The channel ID map 138 shows, for example, that a communication frame having a frame ID "71" is received at the fourth channel 126 of the communication unit 110. As shown in FIG. 2, communication frames generated by the ECU 10i have the frame ID "71," and the communication frames are received by the repeater 100 at the fourth channel 126 of the communication unit 110.

The channel ID map 138 is generated by the generator 160 before generating the routing map 132 when a preset condition is satisfied.

The determiner 150 determines whether a preset condition for generating the routing map 132 is satisfied. The preset condition may be when an external tool (not illustrated) requests that the determiner 150 generate the routing map. For example, the external tool may be an external diagnostic tool that sends a request to the determiner 150 to generate the routing map 132. The preset condition may also be a selection of a master ECU from among all the ECUs constituting the communication system 2. For example, a designation of one ECU from among all the ECUs in the communication system 2 may be the preset condition that the determiner 150 uses to determine the generation of the routing map 132. Another preset condition may be adding a new ECU to the communication system 2. For example, the determiner 150 may use the addition of a new ECU (e.g., an ECU not already listed on the routing map 132) to the communication system 2 as the preset condition for generating the routing map 132.

The determiner 150 may receive an instruction to generate a routing map 132 from the external tool or the master ECU, (i) when a battery is first installed during the manufacturing process of a vehicle and the operation of the communication system 2 is initialized, or (ii) when a replacement battery is installed in a vehicle. That is, the determiner 150 may receive such instruction when the battery is first connected to the vehicle or reconnected to the vehicle (e.g., after disconnecting the vehicle battery for repair of the vehicle and after the installation of a replacement battery), and the vehicle is first started after the connection of the battery. The external tool may be operated, for example, by a worker assembling the vehicle and a repair technician. Upon detecting that the power supply from the battery is started, the master ECU sends a request to generate the routing map 132. When the determiner 150 determines that the preset condition is satisfied (e.g., the master ECU sending a request to generate the routing map 132), the generator 160 generates the routing map 132 and stores it in the memory 130.

2. Routing Map Generation Process

Figure 7:
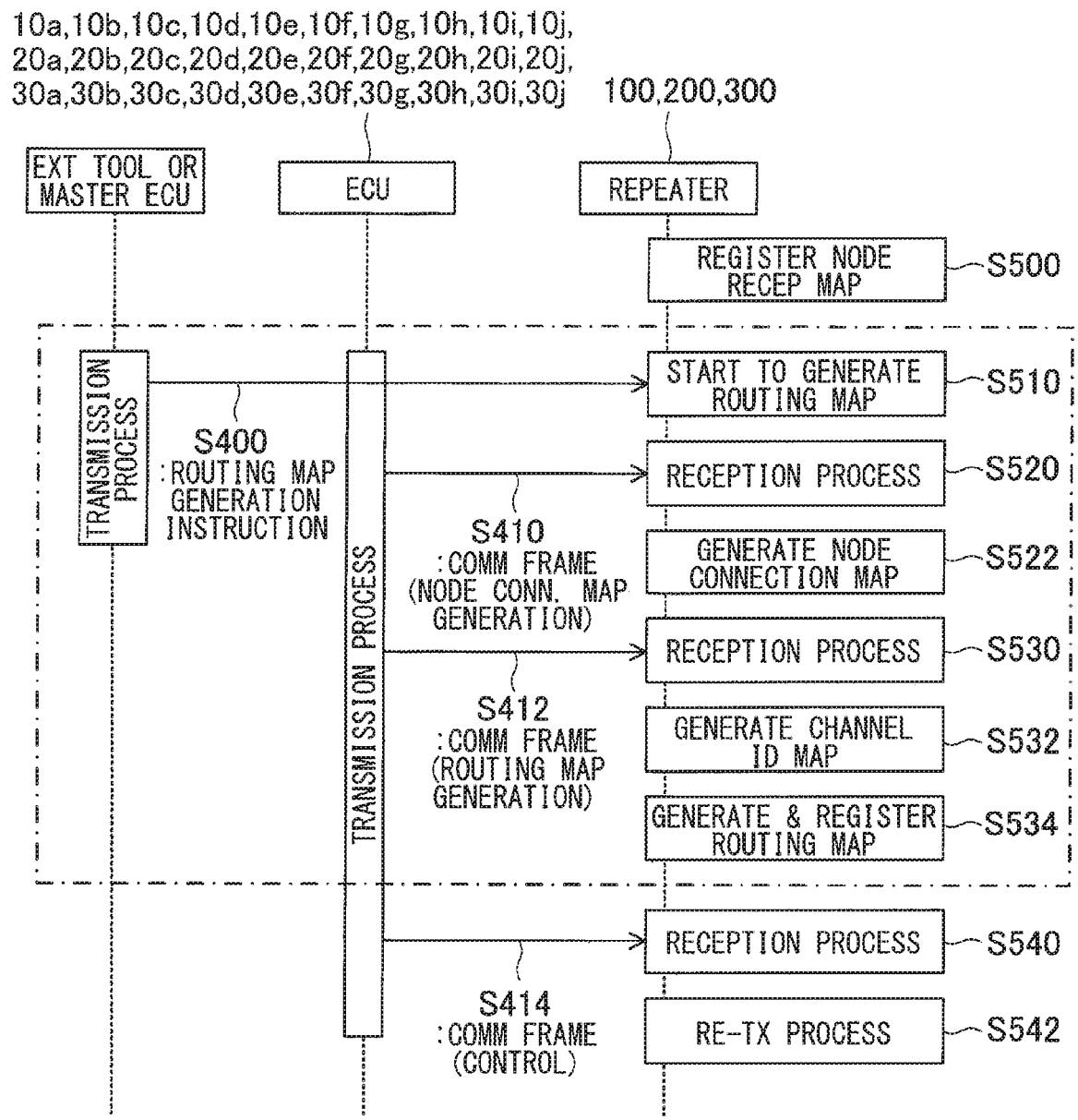
FIG. 7 illustrates a sequence diagram of a routing map generation process.

A routing map generation process performed by the repeaters 100, 200, and 300 is described with reference to a sequence diagram shown in FIG. 7. In FIG. 7, S400 shows a process performed by the above-described master ECU or the external tool. The processes described at S410 to S414 are processes performed by the ECUs 10a to 10j, 20a to 20j, and 30a to 30j connected to the repeaters 100, 200 and 300. The processes at S500 to S542 are processes performed by the repeaters 100, 200, and 300, with the process at S510 more specifically performed by the determiner 150, the processes at S522, S532, and S534 more specifically performed by the generator 160, and the process at S542 more specifically performed by the retransmission unit 140

As described above, since the repeaters 100, 200, and 300 are configured similarly, and since the ECUs 10a to 10j, 20a to 20j, and 30a to 30j are configured similarly, the following description describes the processes generally referring to the repeater 100 and the ECUs 10a to 10j. However, the processes described for the repeater 100 are applicable to repeaters 200 and 300 as well, and the processes for the ECU 10a to 10j are applicable to the ECUs 20a-20j and 30a-30j.

Figure 8:
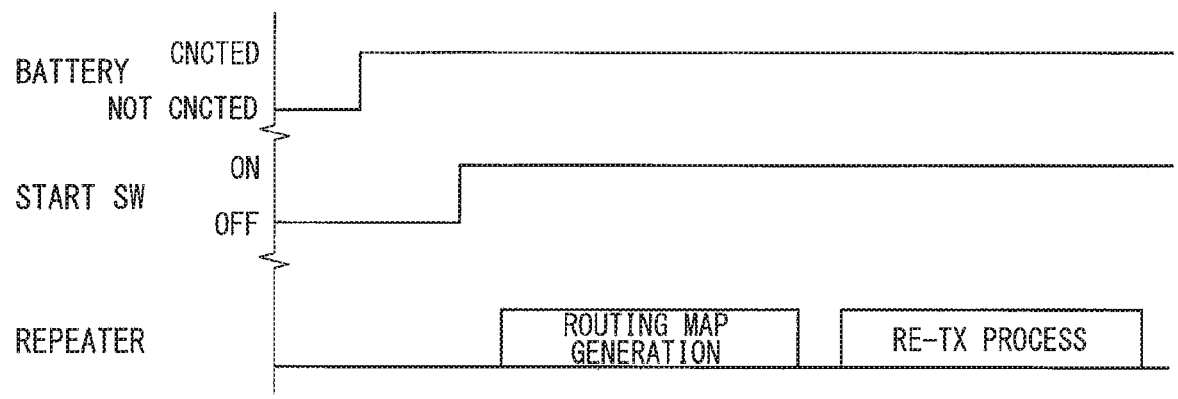
FIG. 8 illustrates a time chart of the routing map generation process when a battery is installed.
Figure 9:
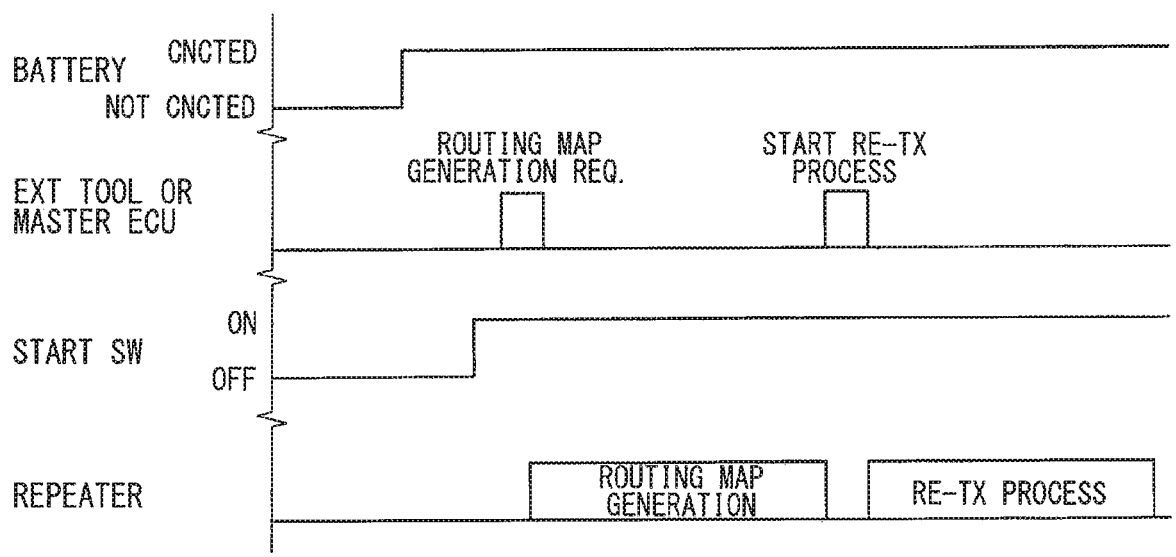
FIG. 9 illustrates a time chart of the routing map generation process when an external tool requests the generation of the routing map.

As shown in FIGS. 8 and 9, at S400, (A) when a vehicle ignition/start switch is first turned ON to start the vehicle after the installation of the battery, or (B) when the master ECU or an external tool connected to the vehicle requests that a routing map be generated after the vehicle has already been turned ON after a battery installation, the determiner 150 in each repeater determines at S510 that a preset condition for generating a routing map is satisfied. Thus, the routing map generation process is started.

Even in instances where the vehicle ignition/start switch is in an OFF state, if the repeaters 100, 200, 300, and to the ECUs 10a to 10j, 20a to 20j, 30a to 30j are able to receive power from the battery (e.g., can work when the vehicle ignition is OFF), each repeater may start the routing map generation process shown in FIG. 7, upon detecting the satisfaction of the preset conditions other than the ignition/start switch ON condition.

Before the routing map generation process shown in FIG. 7 is performed, the node reception map 134 shown in FIG. 4 is stored in advance and registered in the ROM or the flash memory of the memory 130 of the relay device 100 at S500.

At S410, when the preset condition is satisfied, the ECUs 10a to 10j transmit a communication frame with a unique ID of the subject ECU to the repeater 100 for generating the node connection map 136.

At S520, the repeater 100 receives a communication frame from each of the ECUs 10a to 10j with a unique ID of the ECU. The repeater 100 also receives via the fifth channel 128 of the communication unit 110 a communication frame transmitted respectively from the ECUs 20a to 20j and 30a to 30j connected to the other repeaters 200 and 300 with a unique ID of each ECU 20a to 20j and 30a to 30j.

After the repeater 100 receives the communication with the unique IDs of the ECUs 10a to 10j connected to the repeater 100 itself via the first to fourth channels 120, 122, 124, and 126, the repeater 100 transmits the communication frames received from the ECUs connected to the repeater 100 itself to the other repeaters 200 and 300 via the fifth channel 128.

At S522, the repeater 100 generates the node connection map 136 shown in FIG. 5 based on (i) the unique ID of each ECU received by the communication unit 110, and (ii) the channels associated with the unique IDs for receiving the communication frames transmitted by each ECU.

At S412, each of the ECUs 10a to 10j, 20a to 20j, and 30a to 30j transmit a communication frame having a frame ID to the repeater to which the ECU is connected. The communication frame transmitted by each ECU at S412 may be transmitted either for the purpose of generating the routing map 132, or may include vehicle control data in a data portion of the communication frame.

When vehicle control data is in the data portion of the communication frame, the communication frame is retransmitted to a channel of the communication unit 110 to which an intended receiver ECU is connected after the routing map 132 is generated at S534.

At S530, the relay device 100 receives communication frames from each of the ECUs, where each of the communication frames includes a frame ID of the transmitting ECU. Thus, at S532, the generator 160 generates the channel ID map 138 shown in FIG. 6 based on the channels receiving the communication frames and the frame IDs of the communication frames received by each of the channels.

Based on the node reception map 134 and the channel ID map 138 generated at S532, the generator 160 confirms that a frame ID in a communication frame actually received by the communication unit 110 is registered in the node reception map 134.

Based on the node reception map 134 and the node connection map 136 generated at S522, the generator 160 confirms that an ECU registered in the node reception map 134 is actually transmitting a communication frame to the relay device 100.

At S534, the generator 160 determines to which one of the channels 120 to 128 of the communication unit 110 the communication frame identified by a frame ID and received by each channel of the communication unit 110 is to be transmitted based on the node reception map 134 and the node connection map 136.

For example, when the first channel 120 of the communication unit 110 receives a communication frame with a frame ID of "17," the generator 160 recognizes, based on the node reception map 134, the intended receiver ECUs of the communication frame with the frame ID "17," have unique IDs of 43 and 60.

Then, based on the node connection map 136, the generator 160 recognizes that the ECU having the unique ID 43 is connected to the second channel 122, and the ECU having the unique ID 60 is connected to the fifth channel 128. In other words, when the first channel 120 of the communication unit 110 receives the communication frame having the frame ID "17," the generator 160 determines that the communication frame having the frame ID "17" is to be transmitted to the second and fifth channels 122 and 128 of the communication unit 110.

Likewise, when the communication unit 110 receives a communication frame with another frame ID, the generator 160 identifies the channel of the communication unit 110 to which the received communication frame should be transmitted.

Based on the identification of the intended recipient ECUs and their respective channels described above, the generator 160 generates the routing map 132 shown in FIG. 3, and stores the routing map 132 in the memory 130. As described above, the routing map 132 may be stored in a rewritable, nonvolatile memory 130 such as a flash memory or the like.

A routing map 132 is also generated when a new ECU is added to the communication system 2. When a new ECU is added to the communication system 2, the generator 160 erases an old routing map 132 stored in the memory 130, updates the routing map 132 by generating a new routing map 132 to include the new ECU added to the communication system 2, and stores the updated routing map in the memory 130.

After the generator 160 generates the routing map 132 at S534, a communication frame for vehicle control is transmitted from each ECU at S414 and subsequent steps. At S540 and S542, the retransmission unit 140 performs a relay/retransmission process based on the routing map and retransmits the communication frame received by the communication unit 110 to the channel to which the intended receiver ECU(s) is/are connected.

In instances where the external tool requests the generation of the routing map 132, the repeater 100 may send a notification to the external tool indicating that the generation of the routing map 132 is complete. That is, the external tool may include a display that displays a message to the vehicle assembler or repair technician that the generation of the routing map 132 is complete. Then, as shown in FIG. 9, after receiving an instruction to start the retransmission process from the external tool, the retransmission process is subsequently performed by the repeater.

3. Effects

The following effects may be achieved by the above-described embodiment.

Since the repeater 100 generates the routing map 132 using the information in the in-vehicle communication system 2 when a preset condition is satisfied, the repeater 100 does not need to communicate with systems outside the vehicle (e.g., external systems) to generate the routing map 132 after the preconditions are satisfied.

As such, by relying on in-vehicle communication the relay device 100 can generate the routing map 132 without having to communicate with systems and devices outside the vehicle which may be prone to communication issues and communication failures. Since the routing map 132 is generated using in-vehicle communication, there is no need to implement additional security technology for external communications when the routing map is generated. As such, the cost of generating the routing map may be reduced.

When a preset condition is satisfied, the repeater 100 automatically generates the routing map 132 by communicating with the ECUs connected to the repeater 100 and with the ECUs connected to the other repeaters 200 and 300. As such, manually generating the routing map 132 is not required.

By preparing and generating the node reception map 134 for all of the ECUs in the communication system 2 in advance and storing them in the memory 130, the repeater 100 can generate the routing map 132 when the preset condition is satisfied without having to consider the location of the ECUs in the vehicle and without having to consider to which of the repeaters 100, 200, 300 each of the ECUs are connected. As such, the installation locations of the ECUs in the vehicle are irrelevant, and ECUs may be installed with a greater degree of freedom.

If the information for the new ECU(s) to be added to the communication system 2 is registered in advance in the node reception map 134, the repeater 100 is enabled to generate the routing map 132 including the information of the newly added ECU with only a request from the external tool to generate the routing map 132 without regard to the position of the added ECU. That is, the routing map 132 can be generated without considering to which of the repeaters 100, 200, or 300 the added ECU is connected.

4. Other Embodiments

Although an embodiment of the present disclosure has been described above, the present disclosure is not limited to the above-described embodiment. That is, the above-described embodiment may also be modified.

In the above embodiment, the node reception map 134 representing a frame ID of a communication frame received by each ECU is stored in advance in the memory 130. However, when the preset condition is satisfied for generating the routing map 132, the relay device 100 may receive from each ECU, a frame ID of a communication frame that is to be received by each intended receiver ECU, for generating the node reception map 134.

The number of repeaters used in the communication system 2 is not limited to three, as described in the above embodiment.

For example, the number of repeaters used in the communication system 2 may be determined based on such factors as the total number of ECUs installed in the vehicle and wire harness routing to connect the ECUs and the repeaters.

In addition to the above-described repeaters 100, 200, and 300, the present disclosure also contemplates a communication system 2 including those repeaters 100, 200, and 300, their respective ECUs, and additional components. The present disclosure further contemplates the methods performed by the repeaters 100, 200, and 300 and other components of the communication system 2, as well as a non-transitory substantive storage medium such as a semiconductor memory, that stores a program or instruction set, that, when executed by a computer or processing device, causes the methods described above to be performed by the repeaters and other components of the communication system 2.

What is claimed is:

1. A communication system comprising:
a first repeater;
a first electronic control unit (ECU) in direct communication with the first repeater and having a first ECU identifier set in accordance with a vehicle type, wherein the vehicle type is one of a plurality of different vehicle types;
a second ECU in direct communication with the first repeater and having a second ECU identifier set in accordance with the vehicle type;
a second repeater;
a third ECU in direct communication with the second repeater and having a third ECU identifier set in accordance with the vehicle type;
a fourth ECU in direct communication with the second repeater and having a fourth ECU identifier set in accordance with the vehicle type;
wherein the first repeater includes:
a retransmission unit;
a determiner;
a generator;
a non-transitory computer-readable memory including: a routing map, a node reception map, a node connection map, and a channel identification (ID) map; and
a communication unit including: a first channel in direct communication with the first ECU, a second channel in direct communication with the second ECU, and a third channel in direct communication with the second repeater, and
wherein the third channel is in indirect communication with the third ECU and the fourth ECU through the second repeater.

2. The communication system of claim 1,
wherein the first ECU identifier is associated with a first frame identifier,
wherein the second ECU identifier is associated with a second frame identifier,
wherein the third ECU identifier is associated with a third frame identifier,
wherein the fourth ECU identifier is associated with a fourth frame identifier,
wherein the routing map associates the first frame identifier with the first channel,
wherein the routing map associates the second frame identifier with the second channel, and
wherein the routing map associates the third frame identifier and the fourth frame identifier with the third channel.

3. The communication system of claim 2, wherein the node reception map stores:
a first correspondence between a first unique identifier assigned to the first ECU and all frame identifiers intended to be received by the first ECU;
a second correspondence between a second unique identifier assigned to the second ECU and all frame identifiers intended to be received by the second ECU, and
wherein the unique identifiers are unassociated with any vehicle type,
wherein the first unique identifier is different from the first frame identifier, and
wherein the second unique identifier is different from the second frame identifier.

4. The communication system of claim 3, wherein the node connection map associates each unique ID with a corresponding channel of the first repeater to which the each unique ID is connected.

5. The communication system of claim 4, wherein the channel ID map associates each channel of the first repeater with the frame IDs of ECUs from which each channel is respectively expected to receive communication frames.

6. The communication system of claim 5, wherein the communication system is configured to:
   store and register the node reception map before generating the routing map;
   determine that a preset condition for generating a routing map is satisfied;
   start to generate the routing map;
   transmit a communication frame with a unique ID of a subject ECU to the first repeater for generating the node connection map;
   generate the node connection map based on the unique ID of the subject ECU and channels associated with the unique ID;
   transmit, from each ECU, a frame ID to a connected repeater;
   receive a communication frame from each ECU;
   generate the channel ID map;
   generate, by the generator, the routing map;
   update, by the generator, the routing map when a new ECU is added;
   receive a transmitted communication frame; and
   retransmit the transmitted communication frame based on the routing map.

7. The communication system of claim 6, wherein the preset condition is one of:
   (i) a vehicle ignition or start switch is first turned ON after an installation of a battery, and
   (ii) a master ECU or an external tool requests, after the vehicle is turned ON after the battery is connected, that the routing map is generated.

\* \* \* \* \*